No. 781,451. PATENTED JAN. 31, 1905.
A. NIEMEYER.
SUSPENSION DEVICE FOR STREET LAMPS.
APPLICATION FILED APR. 5, 1904.
2 SHEETS—SHEET 1.
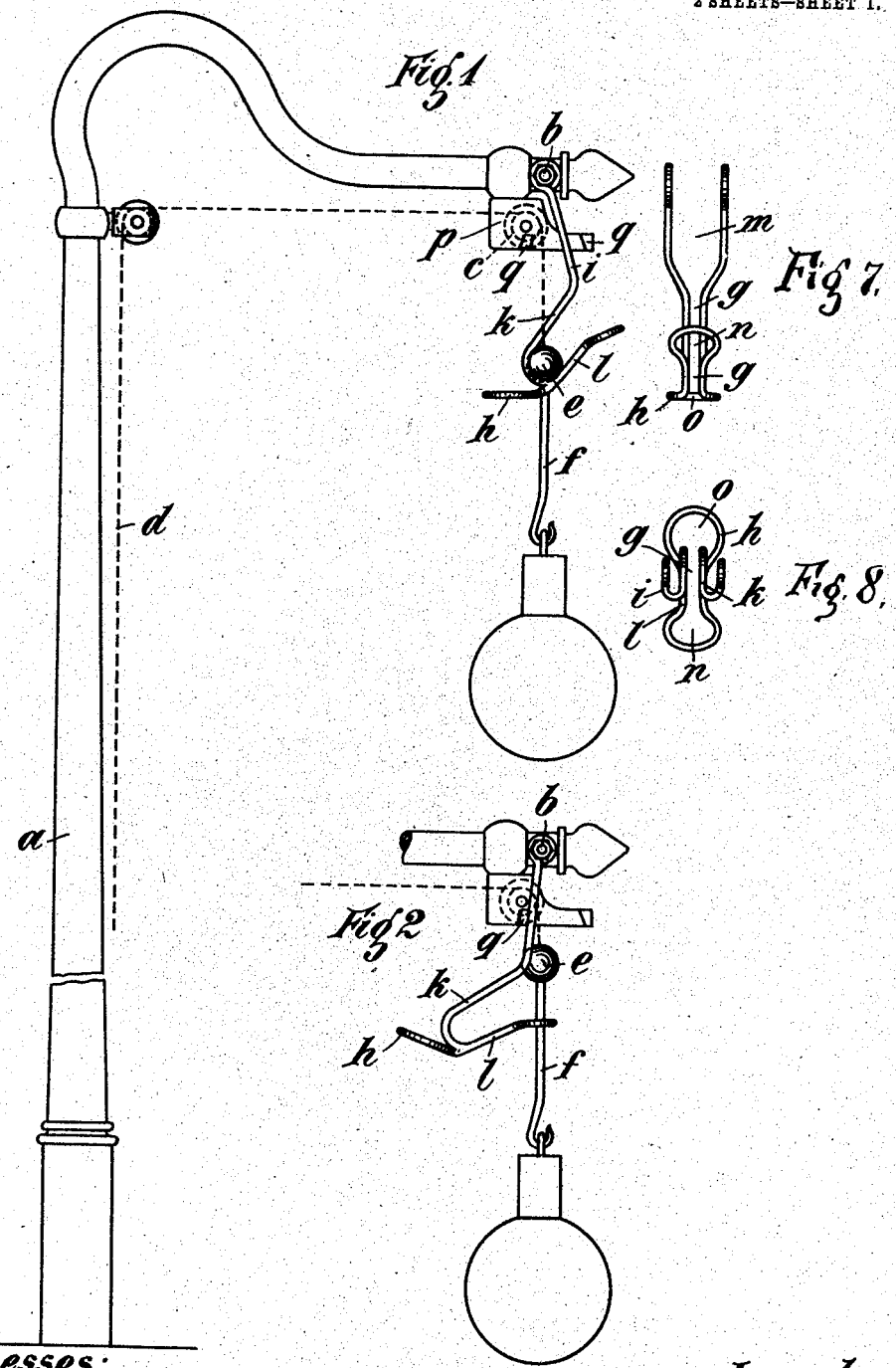

No. 781,451. PATENTED JAN. 31, 1905.
A. NIEMEYER.
SUSPENSION DEVICE FOR STREET LAMPS.
APPLICATION FILED APR. 5, 1904.
2 SHEETS—SHEET 2.
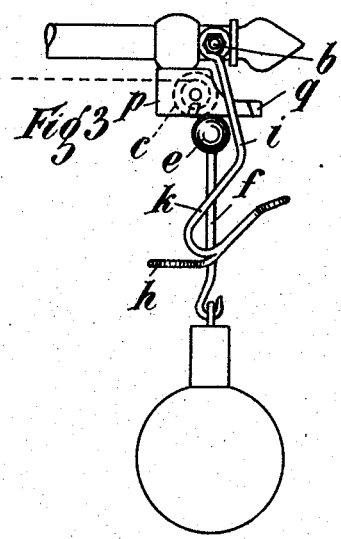
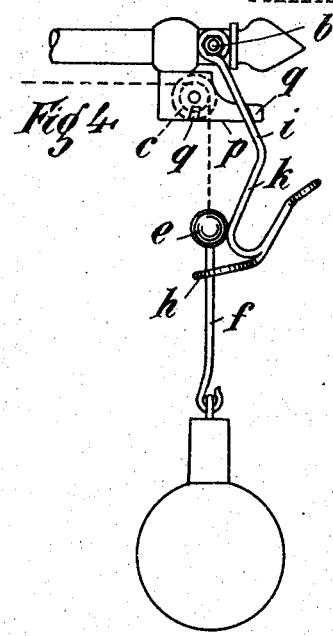
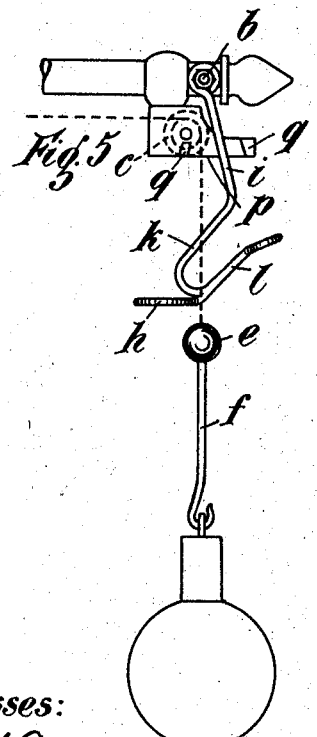
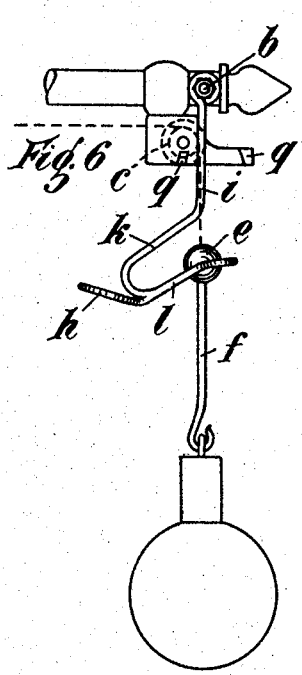
Witnesses:
Inventor.
August Niemeyer No. 781,451. Patented January 31, 1905.

UNITED STATES PATENT OFFICE.

AUGUST NIEMEYER, OF BERLIN, GERMANY, ASSIGNOR TO DEUTSCHE WAFFEN UND MUNITIONS-FABRIKEN, OF BERLIN, GERMANY.

SUSPENSION DEVICE FOR STREET-LAMPS.

SPECIFICATION forming part of Letters Patent No. 781,451, dated January 31, 1905.

Application filed April 5, 1904. Serial No. 201,664.

*To all whom it may concern:*

Be it known that I, AUGUST NIEMEYER, engineer, a subject of the King of Prussia, Emperor of Germany, residing at No. 50 Alt Moabit, Berlin, in the Kingdom of Prussia, German Empire, have invented certain new and useful Improvements in Suspension Devices for Street-Lamps, of which the following is a specification.

Successful devices for the suspension of electric lamps and the like require to be so constructed that the lamp may be readily raised and lowered, and the means for doing so must be of such simple construction as to operate efficiently under all conditions of use and not be liable to get out of repair. It is of especial importance that the suspending-cord shall work freely to quickly and surely engage or disengage the suspending device, as may be desired.

The present invention has for its object to entirely obviate the disadvantages and secure the advantages named. The guide-slot for the cord is completely closed, the bent-up portion having a rearward closed extension forming a continuation of the slot and having an enlargement through which the ball can pass when lowered after first raising it from its seat. The motion of the ball through the enlargement is not affected by shifting the device by hand to a greater or less extent toward the standard or supporting-post of the lamp, but by the hook device itself, this being arranged to oscillate. This oscillation is produced by the weight of the vertically raised and lowered lamp itself by forming the hook with inclined surfaces, against which the ball slides in rising and falling, thereby pushing the hook to one side or the other to such an extent as to bring the respective enlargements into a position directly above or below the ball. As the ball always only moves in a vertical line prescribed by its weight and as the guide-pulley over which the cord is passed is attached to the lamp-standard, all unfavorable action upon the cord is prevented.

On the accompanying drawings is shown, by way of example, a construction of the suspension device according to this invention.

Figure 1 is a side view of the lamp-standard with the suspension device in the normal position with the lamp suspended therefrom. Figs. 2 to 6 show the different relative positions which the hook and the lamp assume during the raising and lowering; and Figs. 7 and 8 show, respectively, a front view and a plan of the hook device detached.

From the standard $a$ the suspending-hook $b$ is hung in such a manner as to be capable of swinging to and from the standard in line vertically with the point of suspension for the hook. To the standard is attached the guide-pulley $c$, over which passes the wire cord $d$, carrying the ball $e$, from which hangs the hooked rod $f$, carrying the lamp. The suspending-hook is so formed of one piece as to have a longitudinal slot $g$ extending through the shank and the nose thereof. The hook has a rearward extension $h$ formed as a loop closing the slot. The shank part of the hook is so bent as to form two inclined surfaces $i$ and $k$, and the nose $l$ also forms an incline. The guide-slot $g$ has three enlargements, the one, $m$, in the vertical part or shank and the other two, $n$ and $o$, in the forwardly-bent-up portion or nose $l$ and in the rear extension $h$.

The hook operates as follows: If the arc-lamp is to be lowered from its normal position at Fig. 1, it is first lifted by means of the cord $d$, causing the ball $e$ to slide along the incline $k$, as at Fig. 2, and thereby press the hook backward toward the standard. When the ball has passed the highest point of the incline $k$, it arrives opposite the enlargement $m$ of the guide-slot, and the hook can then swing back into its normal position, determined by gravity, as at Fig. 3, whereby the ball is made to pass through the enlargement to the back of the hook, as shown. Upon then lowering the lamp the ball slides down along the rear side of the incline $k$, as shown at Fig. 4, thereby pressing the hook forward away from the standard and causing the rod $f$ of the lamp to enter the loop of the rearward extension $h$. When the hook has thus been brought to its extreme position to the right, the enlargement $o$ of the extension will be situated immediately below the ball, so that this can now descend through the slot, whereupon the hook can swing back again into its normal position, as at Fig. 5. The lamp is now completely lowered for the purpose of adjustment, after which it is drawn up again. The ball then bears against the inclined under surface of the bent-up portion $l$ of the hook, thereby pressing the latter to the left, as at Fig. 6, until it can pass through the enlargement $n$ of the slot. The hook then again swings back into its normal position, so that on lowering the cord slightly the ball comes to rest in the bend of the hook, as at Fig. 1, and the cord is then relieved of all strain.

A forked bracket $p$ is fixed to the standard in which is mounted the guide-pulley $c$ and which acts as a stop for the ball $e$ to bear against, so as to prevent the lamp being raised beyond a certain height.

In order to prevent the hook from oscillating to too great an extent in a high wind, fixed stops $q$ are attached to the bracket $p$ or to the standard $a$, which only allow of such an extent of to-and-fro motion of the hook as is necessary for bringing the enlargements of the guide-slot immediately over or under the ball.

As will be seen, the hook consists of a single piece with closed loops which embrace the cord of the arc-lamp so that it cannot become disengaged therefrom. No special devices, no bearing-surfaces, or the like are necessary. Its mode of operation results solely from its own described construction.

It will be obvious that this construction of suspension device can be employed for the suspension of all descriptions of objects that can be raised by means of a cord provided with a ball. In place of a ball may of course be employed any equivalent device constituting a sufficient enlargement on the cord for supporting the lamp or other object on the hook.

Having thus described the nature of my said invention and the best means I know of carrying the same into practical effect, I claim—

1. An automatic suspension device for arc-lamps and the like, consisting of a swinging hook having its outer faces inclined to the vertical and provided with a slot closed at its ends for the reception of the suspension-cord, said slot having an enlarged opening for the passage of a ball or equivalent device upon the cord.

2. An automatic suspension device for arc-lamps and the like, consisting of a swinging rod formed into a hook provided with a slot closed at its ends for the reception of the suspension-cord and in its shank and nose with enlarged openings communicating with the slot for the passage of a ball or equivalent device upon the cord.

3. An automatic suspension device for arc-lamps and the like, consisting of a freely-swinging rod formed into a hook inclined to the vertical provided with a slot closed at its ends for the reception of the suspension-cord and in its shank and nose with enlarged openings communicating with the slot for the passage of a ball or equivalent device upon the cord, and a loop extending rearwardly from the hook and provided with an enlarged opening also communicating with the slot.

4. Automatic suspension device for arc-lamps and other objects consisting of a hook having a longitudinal slot closed at its ends with enlargements for the passage of a ball or equivalent device on the suspension-cord, wherein the cord is prevented from leaving the guide-slot of the hook by means of an extension opposite the bent-up portion of the hook, said extension being formed with an enlargement through which the ball can pass for lowering the lamp.

5. In an automatic suspension device, a free-hanging hook having a longitudinal slot, an incline on the vertical part of said hook along which the ball or other enlargement of the cord slides in being raised, so as to shift the hook backward, an enlargement of the slot above said incline, through which the ball can pass to the rear side of the hook, an incline on such rear side against which the ball slides in descending so as to shift the hook forward and looped rear extension of the hook with enlargement of the slot, which is brought below the ball so that this can descend through it, when the hook is shifted forward.

6. In an automatic suspension device, a free-hanging hook having a longitudinal slot, an incline on the vertical part of said hook, along which the ball or other enlargement of the cord slides in being raised, so as to shift the hook backward, an enlargement of the slot above said incline through which the ball can pass to the rear side of the hook, an incline on such rear side against which the ball slides in descending so as to shift the hook forward, and a looped rear extension of the hook with enlargement of the slot, and a bent-up part of the hook with incline and enlargement of its slot, along which incline the ball slides on being raised by the cord, so as to shift the hook rearward and bring the enlargement into position for the ball to pass through it in order then to drop into the bend of the hook.

7. An automatic suspension device for arc-lamps and other objects, consisting of a hook provided with a closed slot having enlargements for the passage of a ball or equivalent device on the suspension-cord, and having a rearward looped extension for retaining the cord in the slot of the hook, and a stop fixed to the standard of the lamp for preventing the lamp from being raised beyond a certain height.

8. An automatic suspension device for arc-lamps and other objects consisting of a swinging slotted hook formed of an endless loop as of wire and provided with enlargements for the passage of a ball or equivalent device on the suspension-cord, and having a rearward looped extension for retaining the cord in the slot of the hook, a stop fixed to the standard of the lamp for preventing the lamp from being raised beyond a certain height, and fixed stops on the standard for limiting the backward and forward motion of the hook.

9. An automatic suspension device for arc-lamps and the like, consisting of a hook having a bent shank and pivotally suspended at a point substantially in line vertically with the suspension-cord, said hook provided with a slot closed at its ends for the reception of the cord and with enlarged openings in the shank and nose communicating with the slot for the passage of a ball or equivalent device, upon the cord, the enlarged openings normally occupying a position to the side of a vertical line dropped from the point of suspension.

10. An automatic suspension device for arc-lamps and the like, consisting of a hook having a bent shank and pivotally suspended at a point substantially in line vertically with the suspension-cord, said hook provided with a slot closed at its ends for the reception of the cord and with enlarged openings in the shank and nose communicating with the slot for the passage of a ball or equivalent device upon the cord, and a loop extending rearwardly from the hook and provided with an enlarged opening also communicating with the slot, the enlarged openings normally occupying a position under gravity to the side of a vertical line dropped from the point of suspension.

In witness whereof I have hereunto set my hand in presence of two witnesses.

AUGUST NIEMEYER.

Witnesses:
WOLDEMAR HAUPT,
HENRY HASPER.